United States Patent
Hirano (10) Patent No.: US 10,601,022 B2
(45) Date of Patent: Mar. 24, 2020

(54) WIRING MODULE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Yuko Hirano, Mie (JP)

(73) Assignees: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 9 days.

(21) Appl. No.: 15/769,404

(22) PCT Filed: Oct. 3, 2016

(86) PCT No.: PCT/JP2016/079240
§ 371 (c)(1),
(2) Date: Apr. 19, 2018

(87) PCT Pub. No.: WO2017/068943
PCT Pub. Date: Apr. 27, 2017

(65) Prior Publication Data
US 2018/0315986 A1    Nov. 1, 2018

(30) Foreign Application Priority Data
Oct. 23, 2015   (JP) ................................ 2015-208970

(51) Int. Cl.
*H01M 2/34*     (2006.01)
*H01M 10/42*   (2006.01)
(Continued)

(52) U.S. Cl.
CPC .............. *H01M 2/348* (2013.01); *H01G 2/04* (2013.01); *H01G 9/0003* (2013.01); *H01G 9/26* (2013.01);
(Continued)

(58) Field of Classification Search
CPC .. H01G 11/16; H01M 2/1016; H01M 2/1077; H01M 2/202; H01M 2/34; H01M 10/425
See application file for complete search history.

(56) References Cited

U.S. PATENT DOCUMENTS

2002/0086578 A1   7/2002   Ikeda
2013/0288530 A1  10/2013  Zhao
(Continued)

FOREIGN PATENT DOCUMENTS

JP    2000123802 A    4/2000
JP    2013097962 A    5/2013
(Continued)

OTHER PUBLICATIONS

International Search Report for Application No. PCT/JP2016/079240 dated Nov. 8, 2016; 5 pages.

*Primary Examiner* — Jonathan G Jelsma
(74) *Attorney, Agent, or Firm* — Reising Ethington, P.C.

(57) ABSTRACT

A wiring module that is to be attached to a unit cell group in which a plurality of unit cells that each have positive and negative electrode terminals are arranged, including a plurality of basic units arranged in a direction in which the unit cells are arranged. Each of the plurality of basic units includes: a bus bar configured to electrically connect the electrode terminals of two adjacent unit cells to each other; an electrical wire that is to be electrically connected to the unit cells to detect a state of the unit cell group; a fuse configured to electrically connect the bus bar and the electrical wire to each other, and prevent an overcurrent; and a
(Continued)

housing provided with a fuse opening into which the fuse is inserted, and a bus bar opening into which the bus bar is inserted. The fuse opening opens in a direction in which the bus bar extends.

3 Claims, 11 Drawing Sheets

(51) Int. Cl.
| | | |
|---|---|---|
| *H01M 2/20* | (2006.01) | |
| *H01G 11/16* | (2013.01) | |
| *H01M 2/10* | (2006.01) | |
| *H01R 9/22* | (2006.01) | |
| *H01R 11/28* | (2006.01) | |
| *H01G 2/04* | (2006.01) | |
| *H01G 11/10* | (2013.01) | |
| *H01M 10/48* | (2006.01) | |
| *H01G 9/00* | (2006.01) | |
| *H01G 9/26* | (2006.01) | |
| *H01M 2/30* | (2006.01) | |

(52) U.S. Cl.
CPC ............. *H01G 11/10* (2013.01); *H01G 11/16* (2013.01); *H01M 2/1016* (2013.01); *H01M 2/1077* (2013.01); *H01M 2/202* (2013.01); *H01M 2/206* (2013.01); *H01M 2/30* (2013.01); *H01M 10/425* (2013.01); *H01M 10/482* (2013.01); *H01M 10/486* (2013.01); *H01R 9/226* (2013.01); *H01R 11/288* (2013.01); *H01M 2200/10* (2013.01); *H01M 2200/103* (2013.01)

(56) References Cited

U.S. PATENT DOCUMENTS

2014/0322978 A1   10/2014   Okamoto et al.
2017/0207023 A1*  7/2017   Kuboki .................. H01G 11/12

FOREIGN PATENT DOCUMENTS

| JP | 2013114956 A | 6/2013 |
| JP | 2015507819 A | 3/2015 |

* cited by examiner

Figure 11

WIRING MODULE

CROSS REFERENCE TO RELATED APPLICATIONS

This application claims the priority of Japanese patent application JP2015-208970 filed on Oct. 23, 2015, the entire contents of which are incorporated herein.

TECHNICAL FIELD

The present invention relates to a wiring module.

BACKGROUND ART

Conventionally, a battery module in which a plurality of electricity storage devices that each have positive and negative electrode terminals are arranged side-by-side is used as a battery module for electric vehicles and hybrid vehicles. As an example of such a battery module, there is a well-known battery module in which positive and negative electrode terminals are connected to each other by a bus bar, and thus a plurality of electricity storage devices are electrically connected to each other. To electrically connect a plurality of electricity storage devices to each other, a wiring module such as that shown in Patent Document 1 (JP 2013-97962A) is used.

SUMMARY

A configuration that includes electrical wires that are connected to an ECU or the like to detect the states of the electricity storage devices, and overcurrent protection devices that prevent an overcurrent from flowing through the electrical wires is known as a configuration of the aforementioned wiring module. If such a configuration is employed, it is necessary to secure space for disposing the overcurrent protection devices, and it is difficult to realize a thin wiring module.

The technology disclosed in the present Description has been completed in view of the above-described situation, and aims to realize a thin wiring module provided with overcurrent protection devices.

The technology disclosed in the present Description is a wiring module that is to be attached to an electricity storage device group in which a plurality of electricity storage devices that each have positive and negative electrode terminals are arranged. The wiring module includes a plurality of basic units that are arranged in a direction in which the electricity storage devices are arranged. Each of the plurality of basic units includes: a bus bar that is configured to electrically connect the electrode terminals of two adjacent electricity storage devices to each other; an electrical wire that is to be electrically connected to the electricity storage devices to detect a state of the electricity storage device group; an overcurrent protection device that is configured to electrically connect the bus bar and the electrical wire to each other, and prevent an overcurrent from flowing through the electrical wire; and a housing that is provided with a protection device opening into which the overcurrent protection device is inserted, and a bus bar opening into which the bus bar is inserted. The protection device opening opens in a direction in which the bus bar extends.

According to the technology disclosed in the present Description, the protection device opening opens in a direction in which the bus bar extends. With this configuration, it is possible to dispose the overcurrent protection device along the direction in which the bus bar extends, and it is possible to reduce the size in the direction that is orthogonal to the direction in which the bus bar extends. As a result, it is possible to realize a thin wiring module.

Preferably, the electrical wire is drawn out from a proximal end portion of the housing, a distal end portion of the housing that is located opposite the proximal end portion of the housing is provided with an electrical wire holding piece, the plurality of basic units include one basic unit and another basic unit that are arranged adjacent to each other, the proximal end portion of the housing of the one basic unit and the distal end portion of the housing of the other basic unit are arranged adjacent to each other, and the electrical wire that is drawn out from the proximal end portion of the one basic unit is held by the electrical wire holding piece of the other basic unit.

With such a configuration, it is possible to easily handle the electrical wires, using the electrical wire holding pieces to hold the electrical wire. Also, with the above-described configuration, it is possible to arrange the electrical wire holding pieces in the direction in which the plurality of basic units are arranged, and it is possible to route the electrical wires along the plurality of electrical wire holding pieces.

The distal end portion of the housing of the other basic unit may be offset relative to the proximal end portion of the housing of the one basic unit, in a direction in which the electrical wire is drawn out from the proximal end portion.

With the above-described configuration, the base end portion of the electrical wire of the one basic unit and the electrical wire holding piece of the other basic unit can be located closer to each other, and the electrical wire can be held by the electrical wire holding piece with the electrical wire having a small curvature. As a result, it is possible to easily route the electrical wires, and it is possible to reduce bending stress that is applied to the electrical wires.

With the technology disclosed in the present Description, it is possible to realize a thin wiring module.

DESCRIPTION OF EMBODIMENTS

Figure 1:
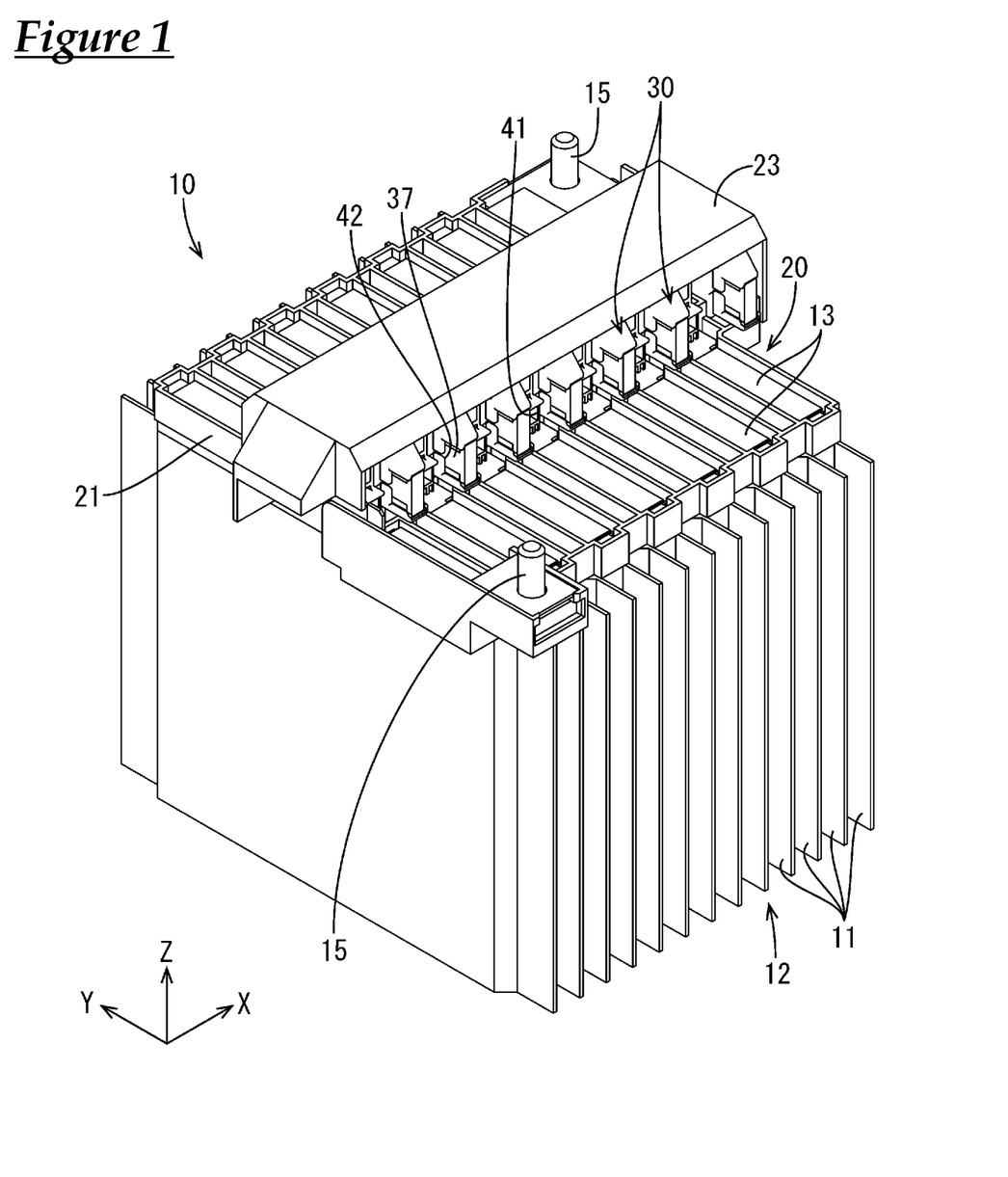
FIG. 1 is a perspective view showing a battery module according to an embodiment.

An embodiment of the present design will be described with reference to FIGS. 1 to 11. As shown in FIG. 1, a wiring module 20 according to the present embodiment constitutes a portion of a battery module 10. The battery module 10 is mounted on a vehicle such as an electrical vehicle or a hybrid vehicle, and is used as a power supply for driving a vehicle. The battery module 10 includes a unit cell group 12 (an example of the electricity storage device group) in which a plurality of unit cells 11 are arranged. The wiring module 20 is attached to the unit cell group 12, to electrically connect adjacent unit cells 11 to each other.

Each unit cell 11 (electricity storage device) has a flat and substantially rectangular parallelepiped shape. Electrode terminals 13 (see FIG. 7) are respectively formed at two end portions of the upper surface of each unit cell 11 in a front-rear direction (the Y axis direction in the figure). One of the pair of electrode terminals 13 is a positive electrode terminal, and the other is a negative electrode terminal. In the unit cell group 12, the unit cells 11 are arranged such that adjacent electrode terminals 13 have different polarities.

Figure 2:
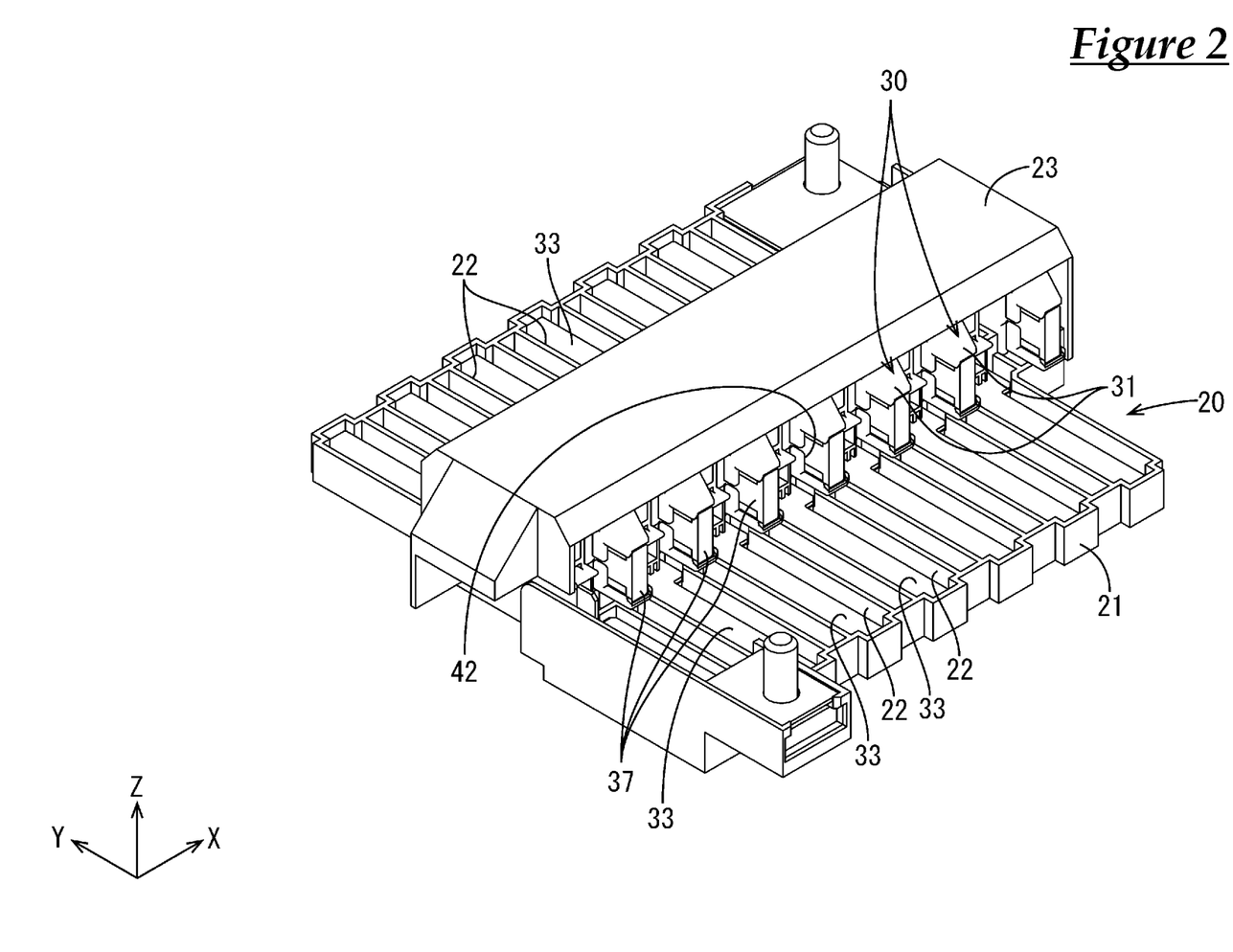
FIG. 2 is a perspective view showing a wiring module in FIG. 1.

As shown in FIG. 2, the wiring module 20 includes a resin protector 21, a plurality of basic units 30 that are placed on the resin protector 21, and a cover 23 that covers all housings 31 (described later) of the plurality of basic units 30 together.

As shown in FIG. 2, the resin protector 21 has a rectangular parallelepiped shape that is thin in the top-bottom direction (the Z axis direction in the figure), and is located so as to cover the unit cell group 12 from above. The resin protector 21 includes bus bar housing portions 22 that house bus bars 33 that are respectively included in the basic units 30.

Figure 3:
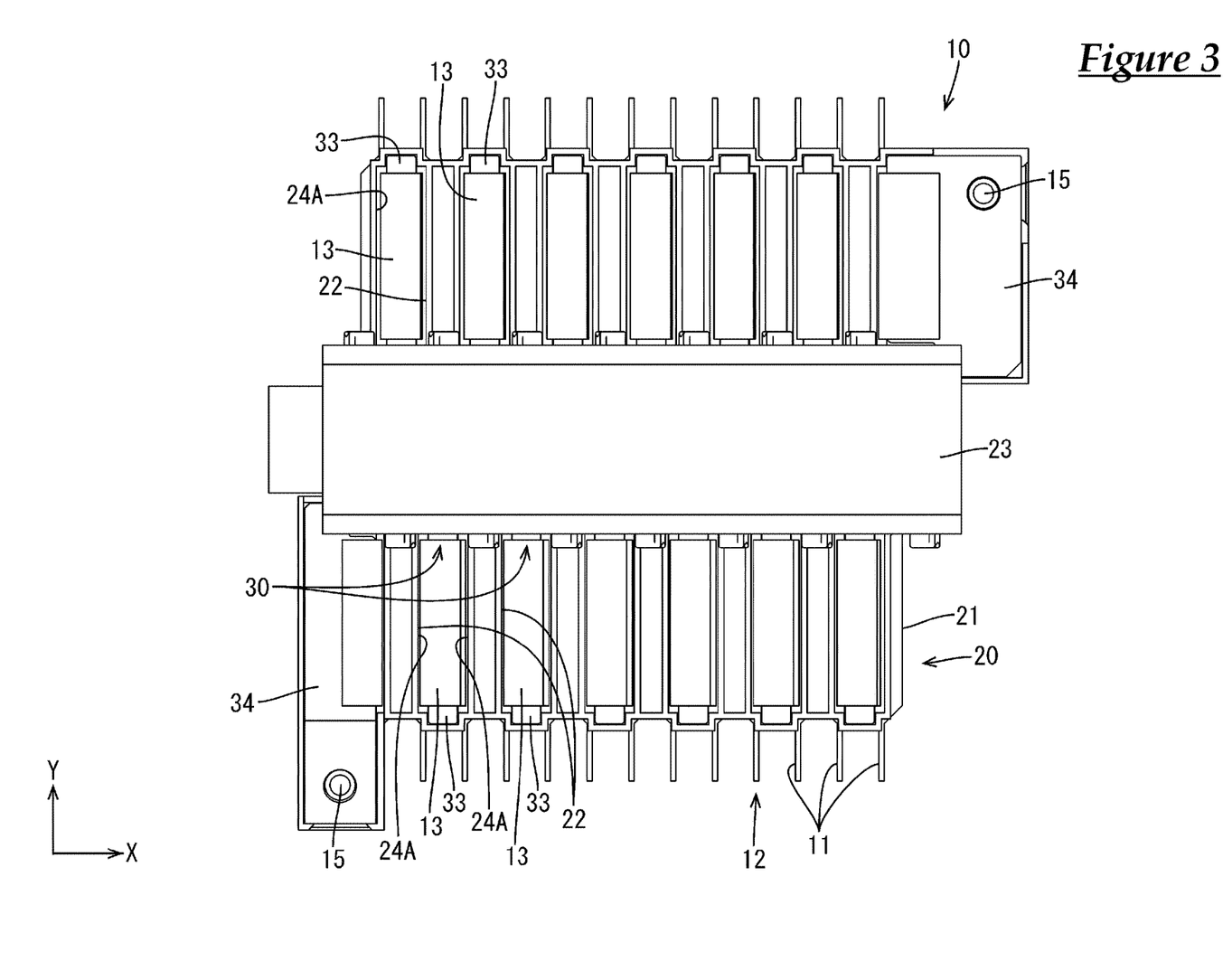
FIG. 3 is a plan view showing the battery module.
Figure 7:
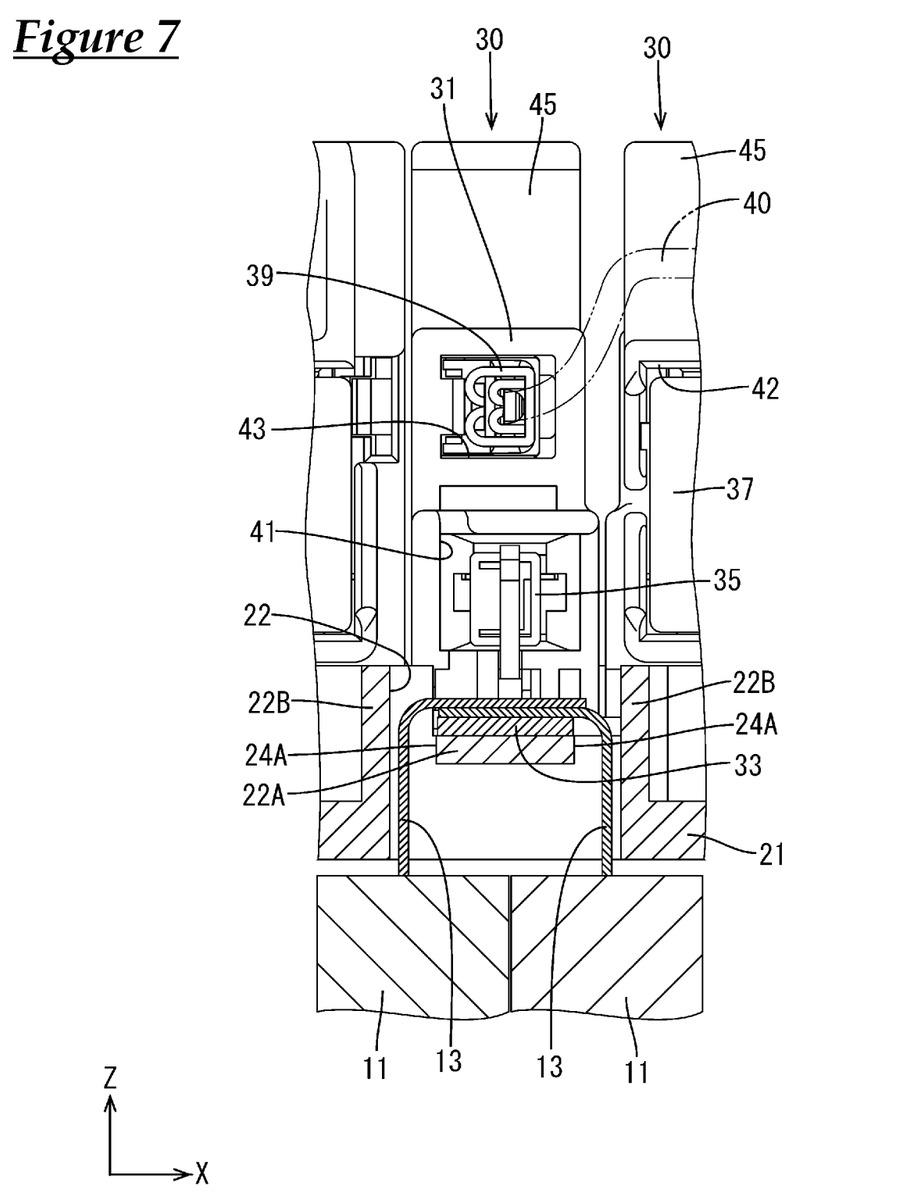
FIG. 7 is a cross-sectional view showing a basic unit (corresponding to a cross-sectional view along a VII-VII line shown in FIG. 4).

In the present embodiment, the plurality of bus bars 33 are arranged on both sides of the unit cells 11 in the front-rear direction (the Y axis direction), relative to the plurality of housings 31 that are arranged in the direction in which the unit cells 11 are arranged (detailed later). As shown in FIG. 3, the plurality of bus bar housing portions 22 are provided in correspondence with the plurality of bus bars 33. Each bus bar housing portion 22 has a substantially box-like shape that opens upward. As shown in FIG. 7, a bus bar 33 is placed on a bottom wall 22A of a bus bar housing portion 22. A through hole 24A that has a rectangular shape is formed so as to be surrounded by side wall portions 22B and a bottom wall 22A that constitute a bus bar housing portion 22, and penetrates in the top-bottom direction. An electrode terminal 13 is inserted into the through hole 24A from below.

Specifically, the electrode terminals 13 of the unit cells 11 extend in the direction in which the bus bars 33 extend, and each have an L-shape in a cross-sectional view. Base end portions of the electrode terminals 13 extend in the top-bottom direction, and are inserted into the through holes 24A. On the other hand, leading end portions of the electrode terminals are bent relative to the base end portions of the electrode terminals 13 so as to cover the upper surfaces of the bus bars 33, and are electrically connected to the bus bars 33. In the present embodiment, the respective electrode terminals 13 of two unit cells 11 that are adjacent to each other are stacked on one bus bar 33. Thus, the respective electrode terminals 13 (a positive electrode terminal and a negative electrode terminal) of two adjacent unit cells 11 are electrically connected to each other via the bus bar 33.

Figure 8:
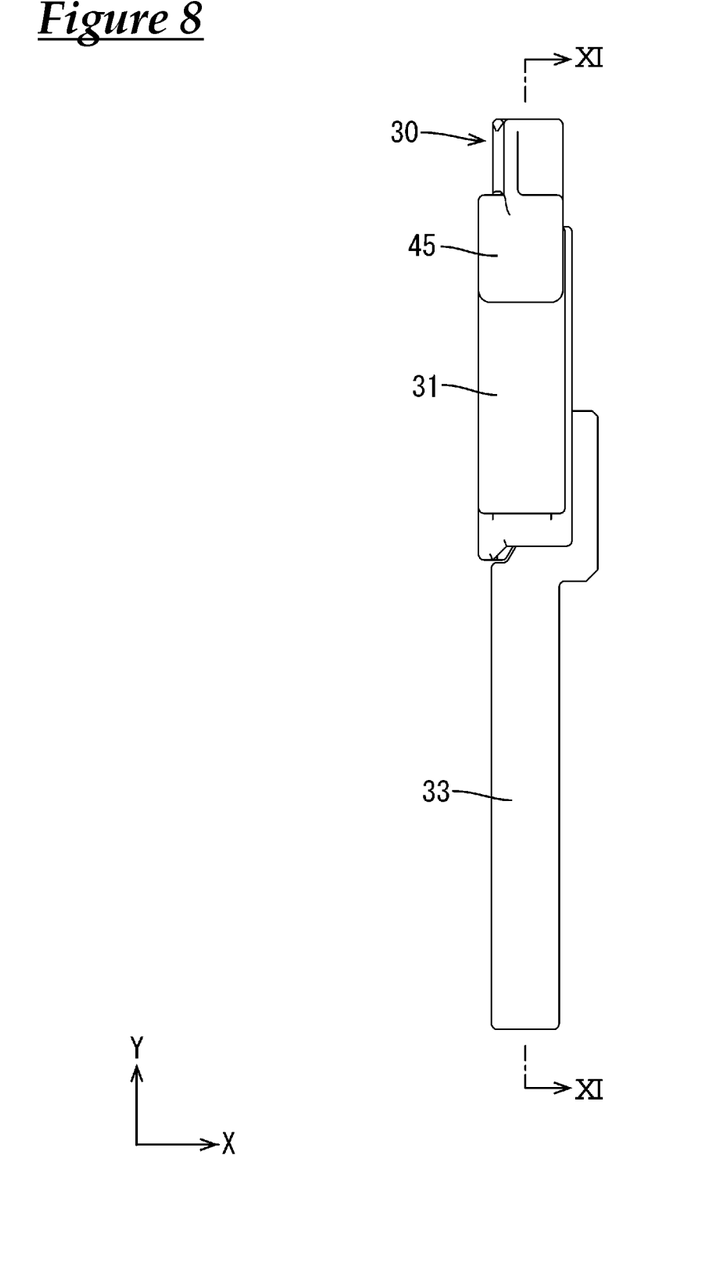
FIG. 8 is a cross-sectional view showing a basic unit.
Figure 9:
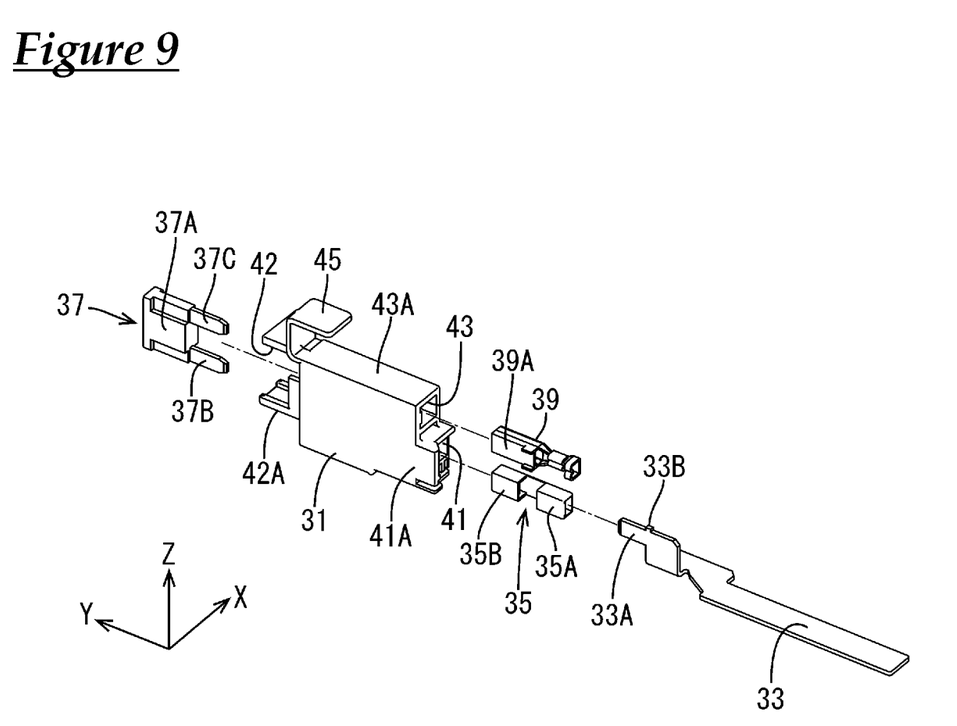
FIG. 9 is an exploded perspective view showing a basic unit.
Figure 10:
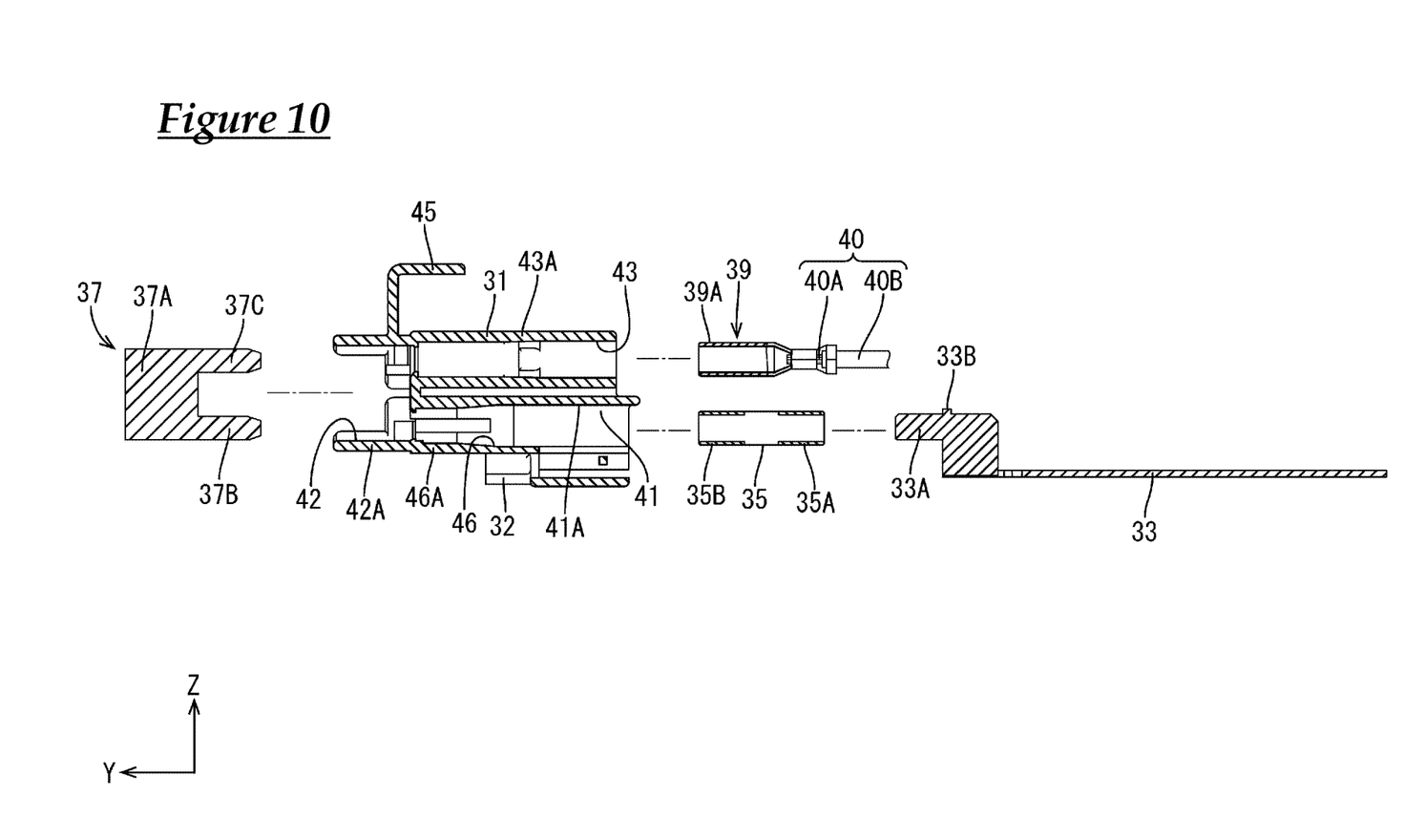
FIG. 10 is an exploded cross-sectional view showing a basic unit.

As shown in FIGS. 8 and 9, each basic unit 30 includes a housing 31, a bus bar 33, a relay terminal 35, a fuse 37 (an overcurrent protection device), an electrical wire terminal 39, and an electrical wire 40 (see FIG. 10). The housing 31 is elongated in the Y axis direction. As shown in FIG. 10, the housing 31 includes: a bus bar housing portion 41A that houses a proximal end portion of a bus bar 33; a relay terminal housing portion 46A that includes a relay terminal housing space 46 in which a relay terminal 35 is housed; a fuse housing portion 42A that houses a fuse 37; and an electrical wire terminal housing portion 43A that houses an electrical wire terminal 39.

The bus bar housing portion 41A has a bus bar opening 41 into which the bus bar 33 is inserted, and the fuse housing portion 42A has a fuse opening 42 (a protection device opening) into which the fuse 37 is inserted. The electrical wire terminal housing portion 43A has an electrical wire terminal opening 43 into which an electrical wire terminal 39 is inserted. The electrical wire terminal housing portion 43A is located above the bus bar housing portion 41A, and the electrical wire terminal opening 43 and the bus bar opening 41 open toward a proximal end of the housing 31 in the lengthwise direction (toward the right in FIG. 10). The fuse opening 42 opens toward a distal end of the housing 31 in the lengthwise direction (toward the left in FIG. 10). That is, the fuse opening 42 and the bus bar opening 41 open in opposite directions.

Figure 6:
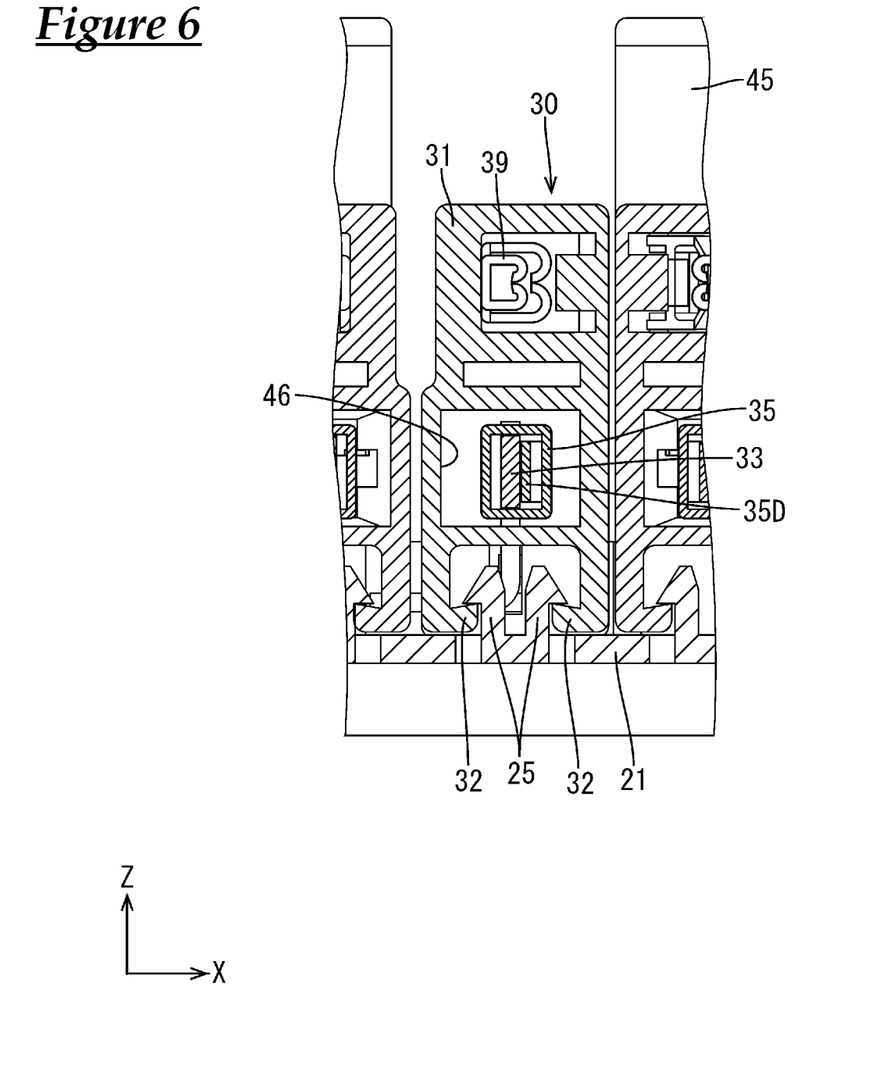
FIG. 6 is a cross-sectional view showing a basic unit (corresponding to a cross-sectional view along a VI-VI line shown in FIG. 4).

A lower portion and an upper portion of the internal space of the fuse housing portion 42A are in communication with the relay terminal housing space 46 and the internal space of the electrical wire terminal housing portion 43A, respectively. An electrical wire holding piece 45 (described later) that has an L-like cantilever shape is provided integrally with the housing 31, on an end portion of the upper surface of the housing 31 that is opposite the electrical wire terminal opening 43. As shown in FIG. 6, a pair of engagement target portions 32, with which a pair of engagement protrusions 25 that are provided on the resin protector 21 are engaged, are provided in a bottom portion of each housing 31. With this configuration, the housings 31 are fixed to the resin protector 21.

The bus bars 33 are formed by punching a plate member that is made of copper or a copper alloy, or aluminum or an aluminum alloy, so as to have a predetermined shape. The surfaces of the bus bars 33 may be plated with metal such as tin or nickel.

Figure 11:
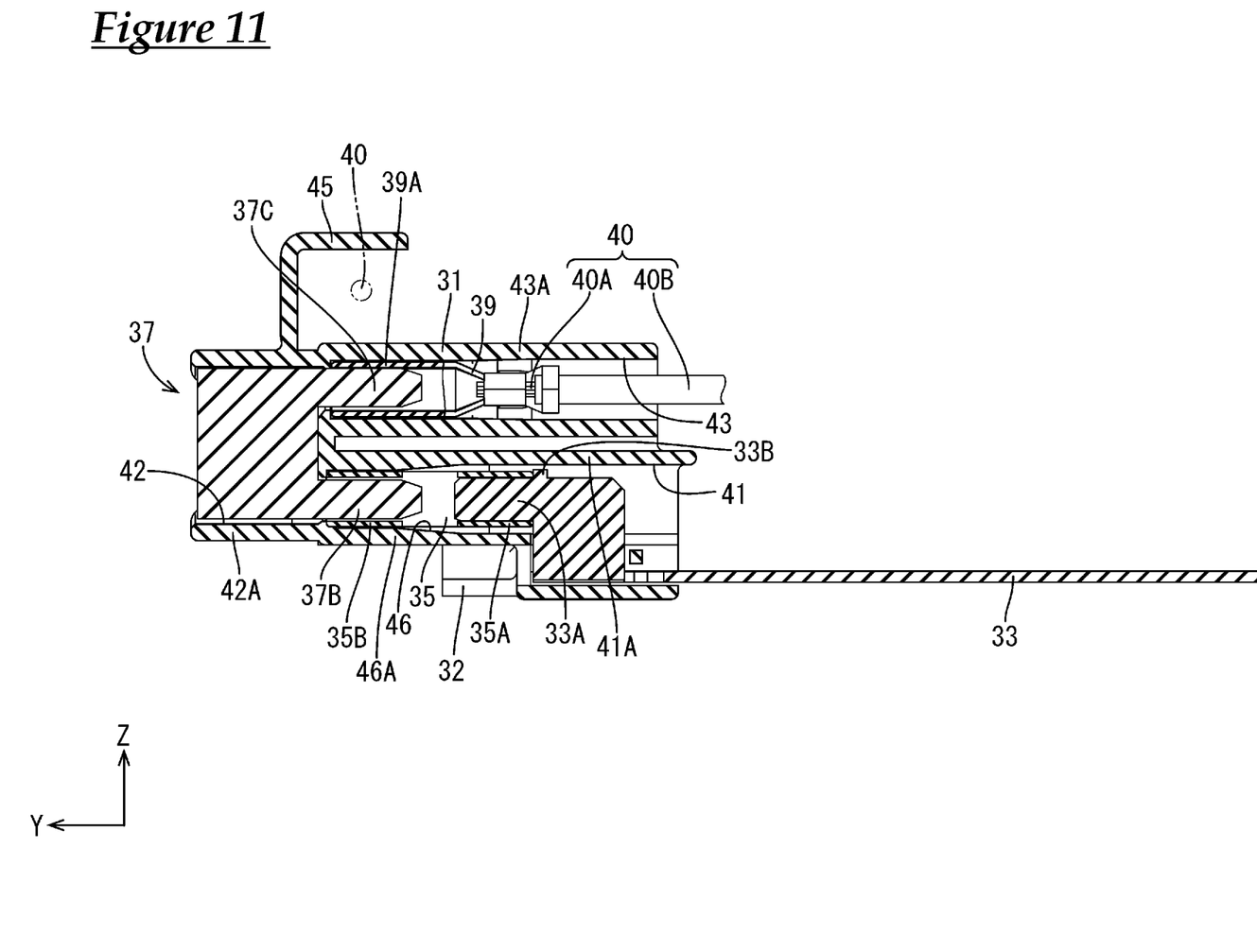
FIG. 11 is a cross-sectional view showing a basic unit (corresponding to a cross-sectional view along a XI-XI line shown in FIG. 8).

As shown in FIG. 10, the relay terminal 35 has a shape that is elongated in the Y axis direction, and includes a proximal end portion 35A and a distal end portion 35B that are tube-shaped. The bus bar 33 and the fuse 37 are electrically connected to each other via the relay terminal 35. As shown in FIG. 11, a proximal end portion 33A of the bus bar 33 in the lengthwise direction is inserted into the proximal end portion 35A of the relay terminal 35. An elastic contact piece 35D (see FIG. 6) is provided inside the proximal end portion 35A. The elastic contact piece 35D elastically comes into contact with the inserted bus bar 33 to hold the bus bar 33. Also, a positioning protrusion 33B is formed on the upper surface of the bus bar 33. As shown in FIG. 11, the protrusion 33B comes into contact with the proximal end portion 35A, and thus the bus bar 33 is restricted from being further inserted.

As shown in FIG. 9, the fuse 37 includes a resin holder 37A and a pair of fuse-side terminals 37B and 37C. As shown in FIG. 11, one fuse-side terminal 37B out of the pair of fuse-side terminals 37B and 37C is inserted into the distal end portion 35B of the relay terminal 35. An elastic contact piece (not shown) is provided inside the distal end portion 35B. The elastic contact piece comes into contact with the inserted fuse-side terminal 37B to hold the fuse-side terminal 37B.

The electrical wire 40 includes a core wire 40A that is formed by twisting a plurality of metal thin wires together, and an insulating coating 40B that is made of a synthetic resin and coats the outer circumferential surface of the core wire. The core wire 40A is made of any metal such as copper, a copper alloy, aluminum, or an aluminum alloy, as appropriate. A portion of the insulating coating 40B is removed from a terminal end of the electrical wire 40, and thus the core wire 40A is exposed to the outside therefrom. The core wire 40A may be a single core wire.

The electrical wire terminal 39 is connected to a proximal end portion of the electrical wire 40. An end portion of the electrical wire terminal 39 that is opposite the electrical wire 40 is a connection portion 39A that is tube-shaped. The other fuse-side terminal 37C out of the pair of fuse-side terminals 37B and 37C is inserted into the connection portion 39A, and is thus connected to the electrical wire terminal 39. An elastic contact piece (not shown) is provided inside the connection portion 39A. The elastic contact piece comes into contact with the inserted fuse-side terminal 37C to hold the fuse-side terminal 37C.

As shown in FIG. 11, the electrical wire 40 is drawn out from a proximal end portion of the housing 31 in the lengthwise direction. The distal end portion of the electrical wire 40 is connected to an ECU (not shown) or the like. The ECU or the like is configured to detect the electrode voltages of the unit cells 11 (the state of the unit cell group 12). In the housings 31 according to the present embodiment, the bus bars 33, the relay terminals 35, the fuses 37, the electrical wire terminals 39, and the electrical wires 40 are connected in this order. Thus, the bus bars 33 and the electrical wires 40 are electrically connected to each other via the fuses 37, and an overcurrent is prevented from flowing from the unit cells 11 to the electrical wires 40.

In the basic units 30 according to the present embodiment, the direction in which the fuse openings 42 open (one side or the other side in the Y axis direction in the present embodiment) extends along the direction in which the bus bars 33 extend (the Y axis direction in the present embodiment). Also, in the present embodiment, as shown in FIG. 1, the plurality of basic units 30 are arranged in the direction in which the unit cells 11 are arranged (the X axis direction). The basic units 30 located at both ends in the direction in which the unit cells 11 are arranged are provided with bus bars 34 (see FIG. 3) instead of bus bars 33. The bus bars 34 have a larger area than the bus bars 33. Each bus bar 34 is configured such that only one electrode terminal 13 of a unit cell 11 is connected thereto. Each bus bar 34 is provided with an electrode terminal 15 for electrical connection to an external device.

Figure 4:
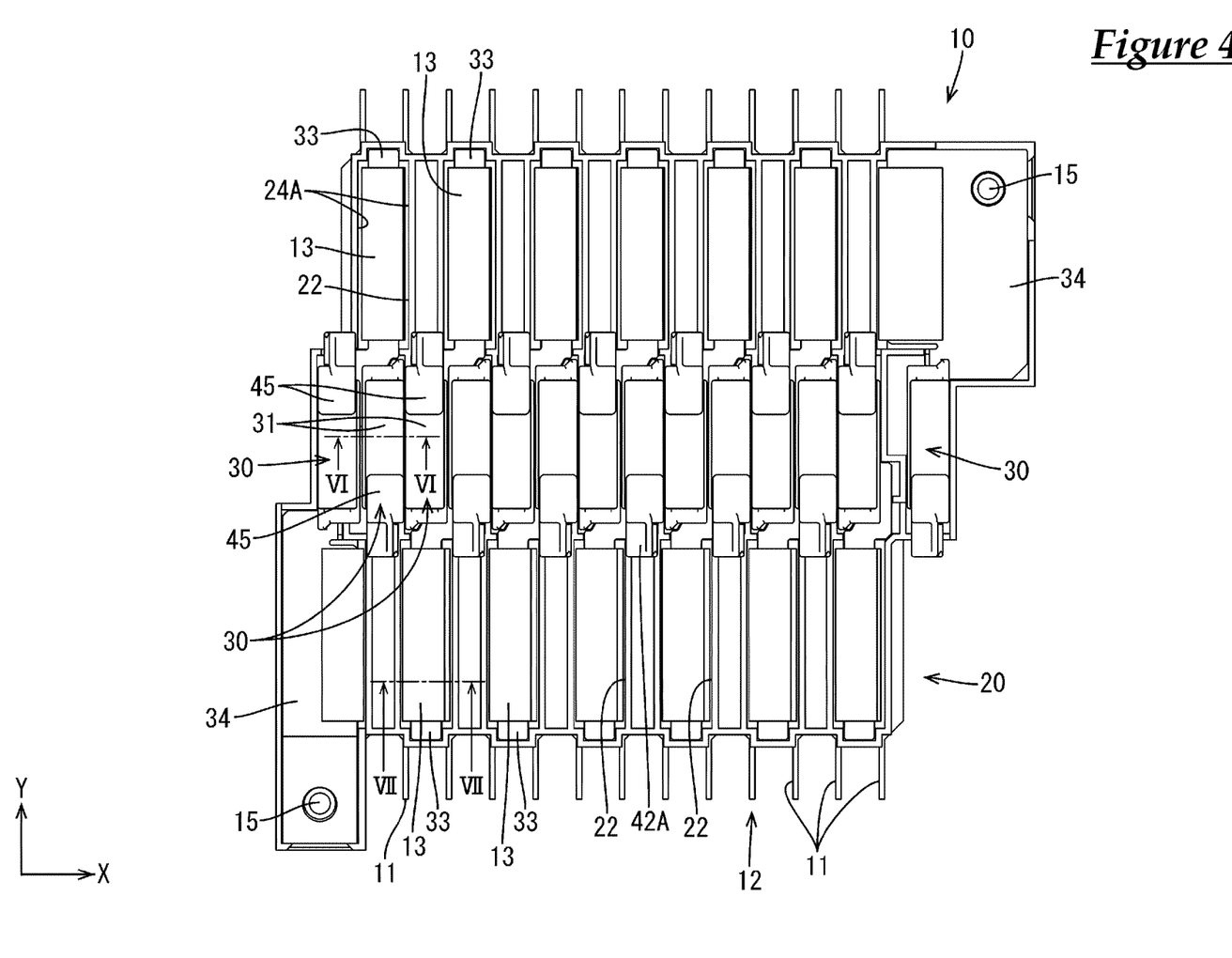
FIG. 4 is a plan view showing the battery module from which a cover has been removed.

In the present embodiment, as shown in FIG. 4, the proximal end portion of the housing 31 of one basic unit 30 out of two adjacent basic units 30, and the distal end portion of the housing 31 of the other basic unit 30, are located adjacent to each other. As described above, in one basic unit 30, the electrical wire 40 is drawn out from the proximal end portion of the housing 31 in the lengthwise direction, and the distal end portion in the lengthwise direction (the distal end portion that is located opposite the proximal end portion) is provided with the electrical wire holding piece 45.

Figure 5:
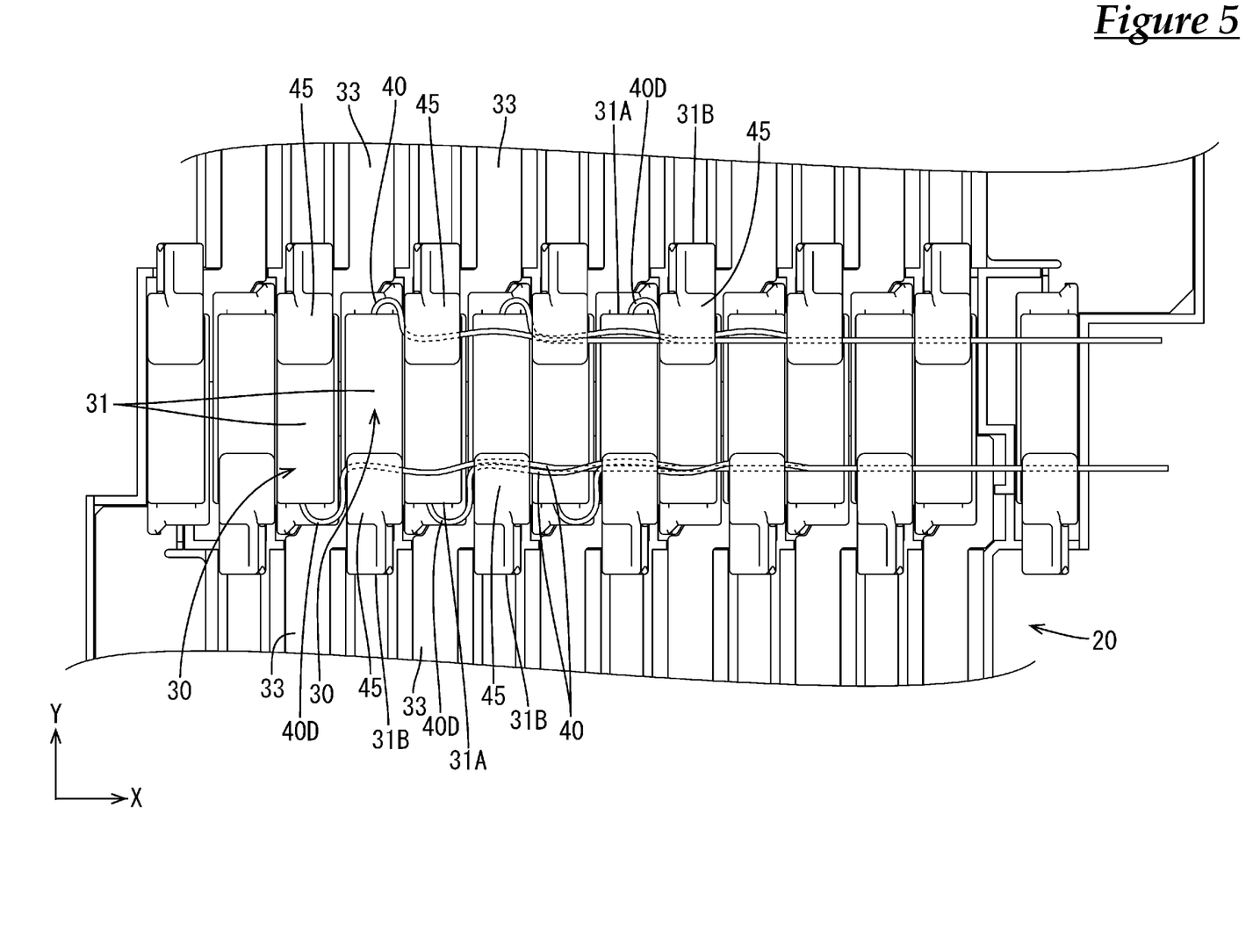
FIG. 5 is a plan view showing a configuration for routing electrical wires.

Therefore, as shown in FIG. 5, the base end portion of the electrical wire 40 drawn out from the housing 31 of the one basic unit 30 is located adjacent to the electrical wire holding piece 45 of the other basic unit 30. Also, as shown in FIG. 2, a fuse opening 42 is located between two adjacent bus bar housing portions 22 in the X axis direction.

The electrical wire 40 is drawn out from the housing 31 in the direction in which the electrical wire terminal opening 43 opens (either side in the Y axis direction), and is then bent toward the other side, and is held by the electrical wire holding piece 45 of an adjacent basic unit 30. Specifically, as shown in FIG. 11, the electrical wire 40 (the two-dotted chain line in FIG. 11) is located between the electrical wire holding piece 45 and the upper surface of the housing 31. A plurality of electrical wire holding pieces 45 are arranged in the X axis direction. The electrical wire 40 is held by the plurality of electrical wire holding pieces 45 so as to be routed in the X axis direction. The electrical wires 40 drawn out from the plurality of housings 31 extend toward one side in the X axis direction (the right side in FIG. 5), and are connected to connectors or the likes (not shown). Note that FIG. 5 shows only some of the plurality of electrical wires 40.

Also, as shown in FIG. 5, relative to a proximal end portion 31A (an end portion from which an electrical wire 40 is drawn out) of the housing 31 of one basic unit 30, a distal end portion 31B (an end portion provided with the electrical wire holding piece 45) of the housing 31 of the other basic unit 30, which is adjacent to the one basic unit 30, is offset in a direction in which the electrical wire 40 is drawn out from the proximal end portion 31A. With this configuration, a base end portion 40D of the electrical wire 40 drawn out from the housing 31 is located closer to an adjacent electrical wire holding piece 45 compared to a configuration in which the distal end portion 31B is not offset. Note that the aforementioned direction in which the electrical wire 40 is drawn out is the same as the direction in which the electrical wire terminal opening 43 opens.

Also, in the present embodiment, the rows of the plurality of electrical wire holding pieces 45 arranged in the X axis direction are provided at the proximal end portions and the distal end portions of the housings 31, and the electrical wires 40 of the basic units 30 are located between two rows of electrical wire holding pieces 45. Therefore, the electrical wires 40 that extend in the X axis direction can be reliably arranged on the upper surfaces of the housings 31.

Method for Assembling Wiring Module 20 and Battery Module 10

Next, one example of the method for assembling the wiring module 20 and the battery module 10 will be described. Note that the method for assembling the wiring module 20 and the battery module 10 is not limited to that shown below. First, the relay terminals 35 are housed in the relay terminal housing spaces 46 from the bus bar openings 41 of the housings 31, and then the bent portions 33A of the bus bars 33 are inserted into the bus bar openings 41 so as to be connected to the proximal end portions 35A of the relay terminals 35. Next, the electrical wire terminals 39 are respectively housed in the electrical wire terminal housing portions 43A of the housings 31.

Then, the fuses 37 are housed in the fuse housing portions 42A from the fuse openings 42. Next, the housings 31 are attached to the resin protector 21, and the bus bars 33 are housed in the bus bar housing portions 22 of the resin protector 21. Finally, the electrical wires 40 drawn out from the housings 31 are hooked on the plurality of electrical wire holding pieces 45. Thus, the wiring module 20 is complete.

Next, the wiring module 20 is attached to the unit cell group 12 from above. At this time, the electrode terminals 13 of the unit cells 11 are inserted into the through holes 24A of the bus bar housing portions 22 from below. Thereafter, upper portions of the electrode terminals 13 are bent toward the bus bars 33, and are connected to the bus bars 33 by performing laser welding or the like. Thus, the battery module 10 is complete. The electrode terminals 13 may be connected to the bus bars 33 by performing arc welding, resistance welding, ultrasonic welding, or the like instead of laser welding.

Effects of Embodiment

Next, effects of the present embodiment will be described. In the present embodiment, the fuse openings 42 open in the direction in which the bus bars 33 extend. With this configuration, the fuses 37 can be arranged in the direction in which the bus bars 33 extend (in other words, the lengthwise direction of the fuses 37 coincides with the Y axis direction), and hence it is possible to reduce the size in the direction (the Z axis direction) that is orthogonal to the direction in which the bus bars 33 extend. As a result, it is possible to realize a thin wiring module 20.

If a configuration in which fuses are attached to the housings from below is employed, the fuses are vertically arranged relative to the resin protector, which increases the thickness of the wiring module 20. Also, if a configuration in which fuses are attached to the housings from below is employed, the fuses cannot be detached or attached in a state where the wiring module is attached to the unit cell group because the fuse openings are closed by the unit cell group. In the present embodiment, the fuse openings 42 are not closed by the unit cell group 12, and the fuse 37 can be attached to and detached from the housings 31 even in a state where the wiring module 20 is attached to the unit cell group 12.

Also, in the present embodiment: the electrical wires 40 are drawn out from the proximal end portions of the housings 31; the electrical wire holding pieces 45 are provided at the distal end portions of the housings 31, which are located opposite the proximal end portions of the housing 31, from which the electrical wires are drawn out; the plurality of basic units 30 include one basic unit 30 and another basic unit 30 that is adjacent to the one basic unit 30; the proximal end portion of the housing 31 of the one basic unit 30 and the distal end portion of the housing 31 of the other basic unit 30 are arranged adjacent to each other; and the electrical wire 40 drawn out from the proximal end portion of the one basic unit 30 is held by the electrical wire holding piece 45 of the other basic unit 30.

With such a configuration, it is possible to easily handle the electrical wires 40, using the electrical wire holding pieces 45 to hold the electrical wires 40. Also, with the above-described configuration, it is possible to arrange the electrical wire holding pieces 45 in the direction in which the plurality of basic units 30 are arranged, and it is possible to route the electrical wires along the plurality of electrical wire holding pieces 45.

The distal end portion of the housing 31 of the other basic unit 30 that is adjacent to the one basic unit 30 is offset relative to the proximal end portion of the housing 31 of the one basic unit 30, in a direction in which the electrical wire 40 is drawn out from the proximal end portion. With the above-described configuration, the base end portion 40D of the electrical wire 40 of the one basic unit 30 and the electrical wire holding piece 45 of the other basic unit 30 can be located closer to each other, and the electrical wire 40 can be held by the electrical wire holding piece 45 with the electrical wire 40 having a small curvature. As a result, it is possible to easily route the electrical wires 40, and it is possible to reduce bending stress that is applied to the electrical wires 40.

Other Embodiments

The present invention is not limited to the embodiment that has been described above with reference to the drawings, and, for example, the following embodiments are also included in the technical scope of the present invention.

In the above-described embodiment, unit cells have been illustrated as examples of the electricity storage devices. However, the present invention is not limited in this way. For example, capacitors or the like may be employed as the electricity storage devices.

In the above-described embodiment, fuses have been illustrated as examples of the overcurrent protection devices. However, the present invention is not limited in this way. For example, PTC thermistors may be employed as overcurrent protection devices.

In the above-described embodiment, a configuration in which the fuses 37 and the bus bars 33 are electrically connected to each other via the relay terminals 35 has been illustrated. However, the present invention is not limited in this way. The fuses 37 and the bus bars 33 may be directly connected to each other.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

11: Unit Cell (Electricity Storage Device)
12: Unit Cell Group (Electricity Storage Device Group)
13: Electrode Terminal
20: Wiring Module
30: Basic Unit
31: Housing
33: Bus Bar
37: Fuse (Overcurrent Protection Device)
40: Electrical Wire
41: Bus Bar Opening
42: Fuse Opening (Protection Device Opening)
45: Electrical Wire Holding Piece

The invention claimed is:

1. A wiring module that is to be attached to an electricity storage device group in which a plurality of electricity storage devices that each have positive and negative electrode terminals are arranged, comprising:
a plurality of basic units that are arranged in a direction in which the electricity storage devices are arranged, wherein each of the plurality of basic units includes:

a bus bar that is configured to electrically connect the electrode terminals of two adjacent electricity storage devices to each other;

an electrical wire that is to be electrically connected to the electricity storage devices to detect a state of the electricity storage device group;

an overcurrent protection device that is configured to electrically connect the bus bar and the electrical wire to each other, and prevent an overcurrent from flowing through the electrical wire; and a housing that includes a protection device opening into which the overcurrent protection device is inserted, a bus bar opening into which the bus bar is inserted, a relay terminal opening into which a relay terminal is inserted, and an electrical wire terminal opening into which the electrical wire is inserted, and the protection device opening, the bus bar opening, the relay terminal opening, and the electrical wire terminal opening all open in a direction in which the bus bar extends.

2. The wiring module according to claim 1, wherein the electrical wire is drawn out from a proximal end portion of the housing, a distal end portion of the housing that is located opposite the proximal end portion of the housing is provided with an electrical wire holding piece, the plurality of basic units includes one basic unit and another basic unit that are arranged adjacent to each other, the proximal end portion of the housing of the one basic unit and the distal end portion of the housing of the other basic unit are arranged adjacent to each other, and the electrical wire that is drawn out from the proximal end portion of the one basic unit is held by the electrical wire holding piece of the other basic unit.

3. The wiring module according to claim 2, wherein the distal end portion of the housing of the other basic unit is offset relative to the proximal end portion of the housing of the one basic unit, in a direction in which the electrical wire is drawn out from the proximal end portion.

* * * * *